United States Patent
Storvick et al.

(10) Patent No.: US 7,172,223 B2
(45) Date of Patent: Feb. 6, 2007

(54) MAGNETICALLY REACTIVE PIVOT LATCH SYSTEM

(75) Inventors: Darrell M. Storvick, Tukwila, WA (US); David A. Pimentel, Maple Valley, WA (US); Karl E. Nelson, Seattle, WA (US); Darryl F. Garrigus, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 1122 days.

(21) Appl. No.: 10/103,320

(22) Filed: Mar. 20, 2002

(65) Prior Publication Data

US 2003/0177797 A1   Sep. 25, 2003

(51) Int. Cl.
*E05C 17/56* (2006.01)
(52) U.S. Cl. ...................... 292/251.5; 70/413
(58) Field of Classification Search ............. 292/251.5; 70/57.1, 276, 413
See application file for complete search history.

(56) References Cited

U.S. PATENT DOCUMENTS

| | | | |
|---|---|---|---|
| 1,881,511 A * | 10/1932 | Grierson et al. ............. 70/276 |
| 3,376,615 A * | 4/1968 | Heckman ...................... 24/303 |
| 3,782,147 A * | 1/1974 | Hallmann ...................... 70/276 |
| 3,951,014 A | 4/1976 | Stellwagen et al. ........... 81/3 R |
| 5,485,733 A | 1/1996 | Hoffman ...................... 70/276 |
| 5,979,196 A * | 11/1999 | Vanmoor ..................... 70/57.1 |
| 6,000,735 A * | 12/1999 | Jourdenais .................. 292/238 |
| 6,851,554 B2 * | 2/2005 | Byrne et al. ............. 206/308.2 |

* cited by examiner

*Primary Examiner*—Gary Estremsky
(74) *Attorney, Agent, or Firm*—Harness Dickey & Pierce P.L.C.

(57) ABSTRACT

A latching system for removably securing a first structure to a second structure. The system includes at least one magnetically permeable latch bar pivotally coupled to the first structure, and a biasing spring that pivots the latch bar to a latched position within a recess in the second structure, thereby securing the first structure to the second structure. Additionally, the system includes an unlatching tool that includes an embedded magnetized bar that generates a magnetic field around the unlatching tool. The unlatching tool can be used to pivot the latch bar to an unlatched position by placing the unlatching tool in close proximity to the latch bar such that the magnetic field exerts a rotational force on the latch bar, thereby pivoting the latch bar to the unlatched position.

31 Claims, 7 Drawing Sheets

MAGNETICALLY REACTIVE PIVOT LATCH SYSTEM

FIELD OF INVENTION

The invention relates generally to a latching system, and more specifically to a magnetically reactive pivot latching system used in applications where it is desirable for the latching system to be concealed from view and generally inaccessible once the system is in a latched position.

BACKGROUND OF THE INVENTION

There are many situations where it is desirable to cover a gap or recess on a surface of a structure. For example, it may be desirable to cover such gaps or recesses for aesthetic reasons or for functional reasons where a smooth even surface is necessary to satisfy a specific purpose of the structure. A specific example of the latter would be the outer surface of an aircraft, and more particularly a low observable or stealthy aircraft where it is desirable to minimize radar detection. Spaces, gaps, or recesses between body panels or around various access panels can be difficult to conceal to reduce detection by radar. Additionally, exposed panel fastener heads such as rivet heads or screw heads, and any sort of aperture or appendage on the outer surface of the aircraft will make it significantly more detectable by radar.

To minimize radar detection, gap covers are installed to cover the spaces, gaps, recesses, rivets, screws, etc. These gap covers, sometimes referred to as seals, require installation without using exposed fasteners. The fastening devices used to install known gap covers are complex and extremely time consuming. Known gap covers utilize complex fastening devices or latching systems, that contain wires, rollers, ferrous wedge plungers, and intricately machined titanium receiving pieces. These require a magnetic tool for both installation and removal. Some known gap covers include an aperture in the gap cover and require a tool be inserted in the aperture to install and remove the gap cover. Other known gap covers have appendages, such as buttons, that are used to install and/or remove the gap cover. Still other known gap treatments require filling, sanding, and material cure times to conceal gaps.

It would therefore be desirable to provide a gap cover free from apertures and appendages that utilizes a simpler, more robust latching system than known gap covers. A simpler, more robust latching system would be easily removable using a non-intrusive tool and would have a design that is less complex and less costly than known gap cover latching systems.

BRIEF SUMMARY OF THE INVENTION

In one preferred embodiment a latching system is provided for removably securing a first structure to a second structure. The system includes at least one magnetically permeable latch bar pivotally coupled to the first structure, and a biasing spring that pivots the latch bar to a latched position within a recess in the second structure, thereby securing the first structure to the second structure. Additionally, the system includes an unlatching tool that includes an embedded magnetized bar that generates a magnetic field around the unlatching tool. The unlatching tool pivots the latch bar to an unlatched position without the unlatching tool physically contacting the latch bar. The latch bar is unlatched by placing the unlatching tool in close proximity to the latch bar such that the magnetic field exerts a rotational force on the latch bar, thereby pivoting the latch bar to the unlatched position.

The present invention is further directed to a method for removably securing a first structure to a second structure. The method includes pivotally coupling a magnetically permeable latch bar to the first structure and pressing the latch bar into a recess in the second structure whereby a biasing spring pivots the latch bar to a latched position such that the first structure is secured to the second structure. Additionally, the method includes use of an unlatching tool that includes an embedded magnetized bar that generates a magnetic field around the unlatching tool. The unlatching tool pivots the latch bar to an unlatched position without the unlatching tool physically contacting the latch bar. The latch bar is unlatched by placing the unlatching tool in close proximity to the latch bar such that the magnetic field exerts a rotational force on the latch bar, thereby pivoting the latch bar to the unlatched position.

The present invention is still further directed to a latching system that includes a first structure having an outer surface free from apertures and appendages, at least one magnetically permeable latch bar pivotally coupled to the first surface, and a biasing spring coupled to said first structure. The biasing spring pivots the latch bar to a latched position within a recess in a second structure, thereby securing said first structure to said second structure.

The present invent is still yet further directed to an unlatching device for unlatching a concealed latching device that includes a magnetically permeable pivotal latch bar. The unlatching tool includes an embedded magnetized bar that generates a magnetic field around the unlatching tool. By placing the unlatching tool in close proximity to the latch bar, the magnetic field of the unlatching tool induces a torque on the pivot latch bar, causing it to rotate to an unlatched position.

BRIEF DESCRIPTION OF THE DRAWINGS

The present invention will become more fully understood from the detailed description and accompanying drawings, wherein.

DETAILED DESCRIPTION OF THE INVENTION

Figure 1:
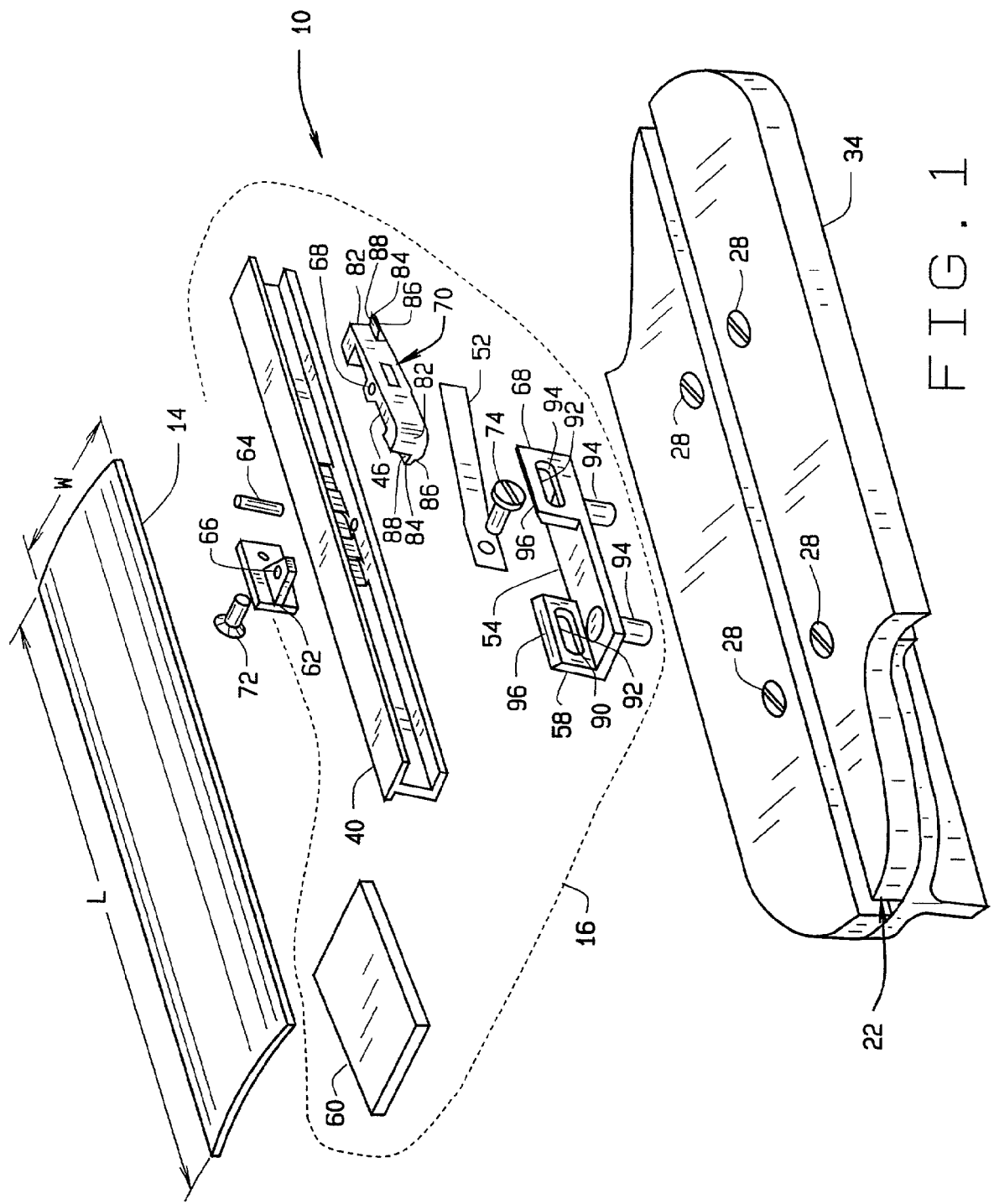
FIG. 1 is an exploded isometric view of a gap covering system that includes a magnetically reactive pivot latching system in accordance with a preferred embodiment of the present invention.

FIG. 1 is an exploded isometric view of a gap covering system 10 in accordance with a preferred embodiment of the present invention. Gap covering system 10 includes a gap cover 14 and at least one magnetically reactive latching system 16. In the preferred embodiment, gap covering system 10 is used to cover at least one gap 22 and/or at least one fastener head 28 in an aircraft outer shell 34, thereby making the aircraft less detectible by radar. Gap 22 is formed between adjacent body panels of outer shell 34 or around various access panels in the outer shell 34. Latching system 16 is used to secure gap cover 14 to aircraft outer shell 34. Gap cover 14 is constructed of a thin sheet of flexible material that can be slightly flexed and will return to the original shape. Additionally, gap cover 14 has a predetermined shape having a length L and a slightly arched predetermined width W. The predetermined shape is configured to coincide with the shape of gap 22. For example if gap 22 is a gap around an aircraft door, gap cover 14 would have a shape coinciding with, or matching, the shape of the perimeter of the aircraft door. In such a case, gap cover 14 would have a length L equal to the perimeter measurement of the aircraft door and a slightly arched predetermined width W. In the preferred embodiment, gap cover 14 has a smooth, non-textured outer surface free from holes, buttons, handles, and any other type of aperture or appendage. In an alternative embodiment, gap cover 14 may have a textured outer surface.

Latching system 16 includes at least one stiffener 40 longitudinally coupled to gap cover 14, thereby providing longitudinal support and/or rigidity to gap cover 14. In one preferred embodiment, stiffener 40 is permanently glued to gap cover 14 and is a J-channel such that a cross-sectional area perpendicular to the length of stiffener 40 has a 'J' shape. In an alternative embodiment, stiffener 40 is permanently affixed to gap cover 14 using any other suitable means that does not require gap cover 14 to include any apertures or appendages, for example stiffener 40 could be welded to gap cover 14. Also alternatively, the cross-sectional area of stiffener 40 can have any shape suitable to give longitudinal support to cover 14, such as an 'I', or a 'T', or a 'C'.

Additionally, latching system 16 includes at least one magnetically permeable latch bar 46, a biasing spring 52, a latch channel 54 that includes at least one strike tab 58, a non-intrusive unlatching device 60, and pivot fitting 62. In an alternate embodiment, unlatching device 60 includes a handle. Latch bar 46 is pivotally coupled to stiffener 40 using pivot fitting 62 and a pivot pin 64. Pivot pin 64 is slip-fit inserted through a first pivot latch hole 68, then slip-fit through a pivot fitting hole 66 in pivot fitting 62, then slip-fit through a second pivot latch hole 70. Thus, latch bar 46 is pivotally coupled to stiffener 40 via pivot fitting 62. Pivot fitting 62 is coupled to stiffener 40 using fastener 72. Fastener 72 can be any fastening device suitable to couple pivot fitting 62 to stiffener 40 such as a screw, rivet or snap. Unlatching device 60 is described below in reference to FIGS. 3–7.

In a preferred embodiment, biasing spring 52 comprises a leaf spring coupled to stiffener 40 using a fastener 74 and is in frictional contact with latch bar 46. Fastener 74 can be any fastening device suitable to couple biasing spring 52 to stiffener 40 such as a screw, rivet or snap. Biasing spring 52 applies a rotational force to latch bar 46 that pivots latch bar 46 about pivot pin 64 to a latched position. Absent a stronger counterforce, biasing spring 52 maintains latch bar 46 in the latched position. In an alternative embodiment, biasing spring 52 is any other type of spring or device suitable for applying a constant rotational force to latch bar 46 such that, absent a stronger counterforce, latch bar 46 is maintained in the latched position.

Latch bar 46 includes a pair of opposing ends 82 wherein at least one latch bar end 82 includes a latching tab 84 extending from a side of end 82 and having a first beveled surface 86 facing away from gap cover 14. Additionally, latching tab 84 includes a second beveled surface 88 facing toward gap cover 14. Second beveled surface 88 is beveled such that second beveled surface 88 is angled from a distal end of latching tab 84 down toward a proximal end of latching tab 84. Strike tab 58 of latch channel 54 includes a slot 90. Slot 90 includes an inclined surface 92 which is the surface of slot 90 nearest gap cover 14. Second beveled surface 88 of latching tab 84 and inclined surface 92 of slot 90 are angled in such a manner as to hold latch bar 46 in the latched position. For example, second beveled surface 88 and inclined surface 92 are angled approximately 3 degrees in opposite directions such that surfaces 88 and 92 are interlocked. Latch channel 54 is coupled to outer shell 34, within gap 22 using at least one fastener 94. Additionally, strike tab 58 has a beveled surface 96 that faces away from outer shell 34. Fastener 94 can be any fastening device suitable to permanently couple latch channel 54 to outer shell 34 within gap 22 such as a screw, rivet or snap. Alternatively, latch channel 54 could be permanently glued or welded to outer shell 34 within gap 22. In the preferred embodiment, latching system 16 includes two strike tabs having beveled surfaces 92 and 96 and both latch bar ends 82 have latching tabs 84 with beveled surfaces 86 and 88.

Once stiffener 40 is coupled to gap cover 14, latch bar 46 is coupled to stiffener 40 via pivot fitting 62, and latch channel 54 is coupled to outer shell 34 within gap 22, pressing stiffener 40 and latch bar 46 into gap 22 at the location of latch channel 54 will cause latching tab first beveled surface 86 to contact the beveled surface 96 of strike tab 58. The contact between first beveled surface 86 and beveled surface 96 forces latch bar 46 to pivot in direction counter to the force of biasing spring 52. Continuing to press latch bar 46 into gap 22 will cause latch bar 46 to pivot such that latching tab 84 moves around strike tab beveled surface 96. As latching tab 84 moves around beveled surface 96, biasing spring 52 causes latch bar 46 to pivot, or snap, back such that latching tab 84 protrudes into strike tab slot 90. When latching tab 84 protrudes into tab slot 90 latching tab second beveled surface 88 interlocks with strike tab inclined surface 92, thereby interlocking latch bar 46 with latch channel 54. Thus, gap cover 14 is coupled to outer shell 34. The interference caused by the interlocking of second beveled surface 88 and inclined surface 92 requires gap cover 14 to be flexed down from the slightly arched shape in order for latch bar 46 to latch and unlatch.

The flexible material of gap cover 14 combined with the slightly arched width W of gap cover 14 creates a retention force in a direction perpendicular to outer shell 34. Interlocking latch bar 46 with latch channel 54 requires that stiffener 40 and latch bar 46 be pushed a distance into gap 22 that causes the slightly arched width W of gap cover 14 to be flexed to have an effectively flat shape. Once latch bar 46 has snapped into the latched position, pressure is released and gap cover 14 flexes back to the slightly arched shape, thereby applying a retaining force to latching system 16. The retaining force combined with the force of biasing spring 52 and the interlocking features of second beveled surface 88 on latching tab 84 and inclined surface 92 in slot 90 in strike tab 58 maintains latch bar 46 in the latched position such that vibration, minor flexing, and other movements of outer shell 34 or gap cover 14 incurred during normal operation of the aircraft will not cause latching system 16 to unlatch.

Figure 2:
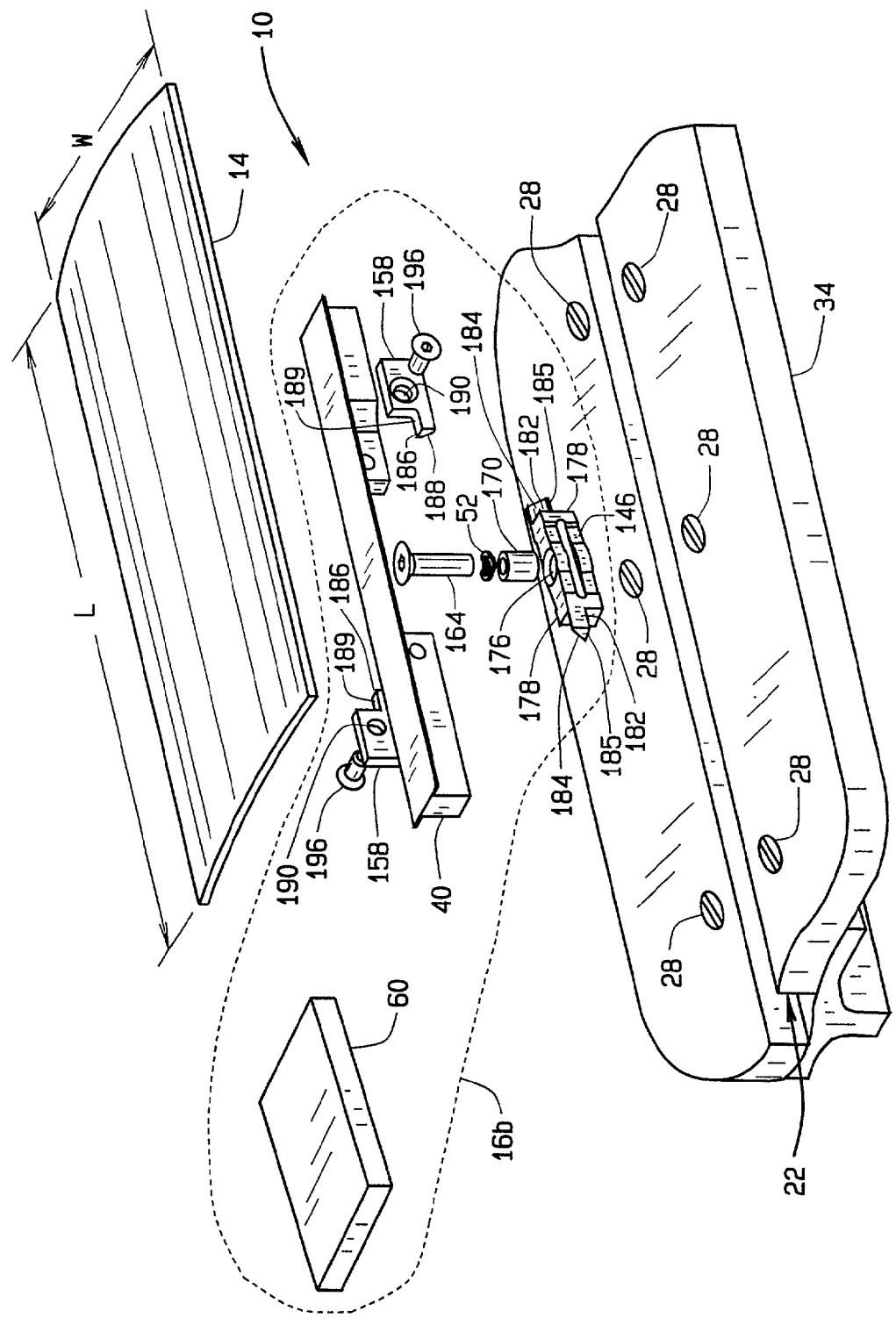
FIG. 2 is an exploded isometric view of an alternate embodiment of the gap covering system shown in FIG. 1.

FIG. 2 is an exploded isometric view of an alternate embodiment of the gap covering system 10 (shown in FIG. 1). Components in FIG. 2 identical to components in FIG. 1 are identified in FIG. 2 using the same reference number used in FIG. 1. In this embodiment, a latching system 16b includes at least one magnetically permeable latch bar 146, biasing spring 52, at least one strike plate 158, and non-intrusive unlatching tool 60. Latch bar 146 is pivotally coupled to outer shell 34 within gap 22 using a fastener 164 and a bushing 170. Bushing 170 is inserted into a hole 176 in latch bar 146 and fastener 164 is inserted through bushing 170 and coupled to outer shell 34 within gap 22, thereby pivotally coupling latch bar 146 outer shell 34 within gap 22. Fastener 164 can be any fastening device suitable to pivotally couple latch bar 146 to outer shell 34 such as a screw, rivet or snap.

Latch bar 146 includes a pair of opposing ends 178 wherein at least one latch bar end 178 includes a first latching tab 182 extending longitudinally from latch bar end 178 and having a first beveled surface 184 facing away from outer shell 34 and a second beveled surface 185 facing toward outer shell 34. Strike plate 158 includes a second latching tab 186 extending longitudinally from strike plate 158 and having a beveled surface 188 facing away from gap cover 14 and an inclined surface 189 facing toward gap cover 14. Second beveled surface 185 of latching tab 182 and inclined surface 189 of second latching tab 186 of strike plate 158 are angled in opposite directions such that first latching tab 182 interlocks with second latching tab 186. For example, second beveled surface 185 and inclined surface 189 are angled 3 degrees in opposite directions. Additionally, strike plate 158 includes a hole 190 and is coupled to stiffener 40 using a fastener 196 inserted through hole 190. Fastener 196 can be any fastening device suitable to permanently couple strike plate 158 to stiffener 40 such as a screw, rivet or snap. Alternatively, strike plate 158 could be permanently glued or welded to stiffener 40. Stiffener 40 is permanently coupled to gap cover 14 as described above in reference to FIG. 1. Preferably, latching system 16b includes two strike plates 158 having second latching tabs 186 and beveled surfaces 188, and both latch bar ends 178 include a first latching tab 182 having beveled surfaces 184 facing away from outer shell 34.

Once latch bar 146 is coupled to outer shell 34 and strike plate 158 is coupled to stiffener 40, pressing stiffener 40 and strike plate 158 into gap 22 at the location of latch bar 146 will cause second latching tab beveled surface 188 to contact first latching tab first beveled surface 184 forcing latch bar 146 to pivot in direction counter to the force of biasing spring 52. Continuing to press stiffener 40 and strike plate 158 into gap 22 will cause first latching tab 182 to pivot around second latching tab 186. When second latching tab 186 is pressed past first latching tab 182, biasing spring 52 forces latch bar 146 to snap, or pivot, back into the latched position interlocking first latching tab 182 and second latching tab 186, thereby coupling gap cover 14 to outer surface 34.

The flexible material of gap cover 14 combined with the slightly arched width W of gap cover 14 creates a retention force in a direction perpendicular to outer shell 34. Interlocking first latching tab 182 with second latching tab 186 requires that stiffener 40 and strike plate 158 be pushed a distance into gap 22 that causes the slightly arched width W of gap cover 14 to be flexed to have an effectively flat shape. Once latch bar 146 has snapped into the latched position, pressure is released and gap cover 14 flexes back to the slightly arched shape, thereby applying a retaining force to latching system 16b. The retaining force combined with the force of biasing spring 52 and the interlocking features of second beveled surface 185 on first latching tab 184 and inclined surface 189 on second latching tab 186 maintains latch bar 146 in the latched position such that vibration, minor flexing, and other movements of outer shell 34 or gap cover 14 incurred during normal operation of the aircraft will not cause latching system 16b to unlatch.

Figure 3:
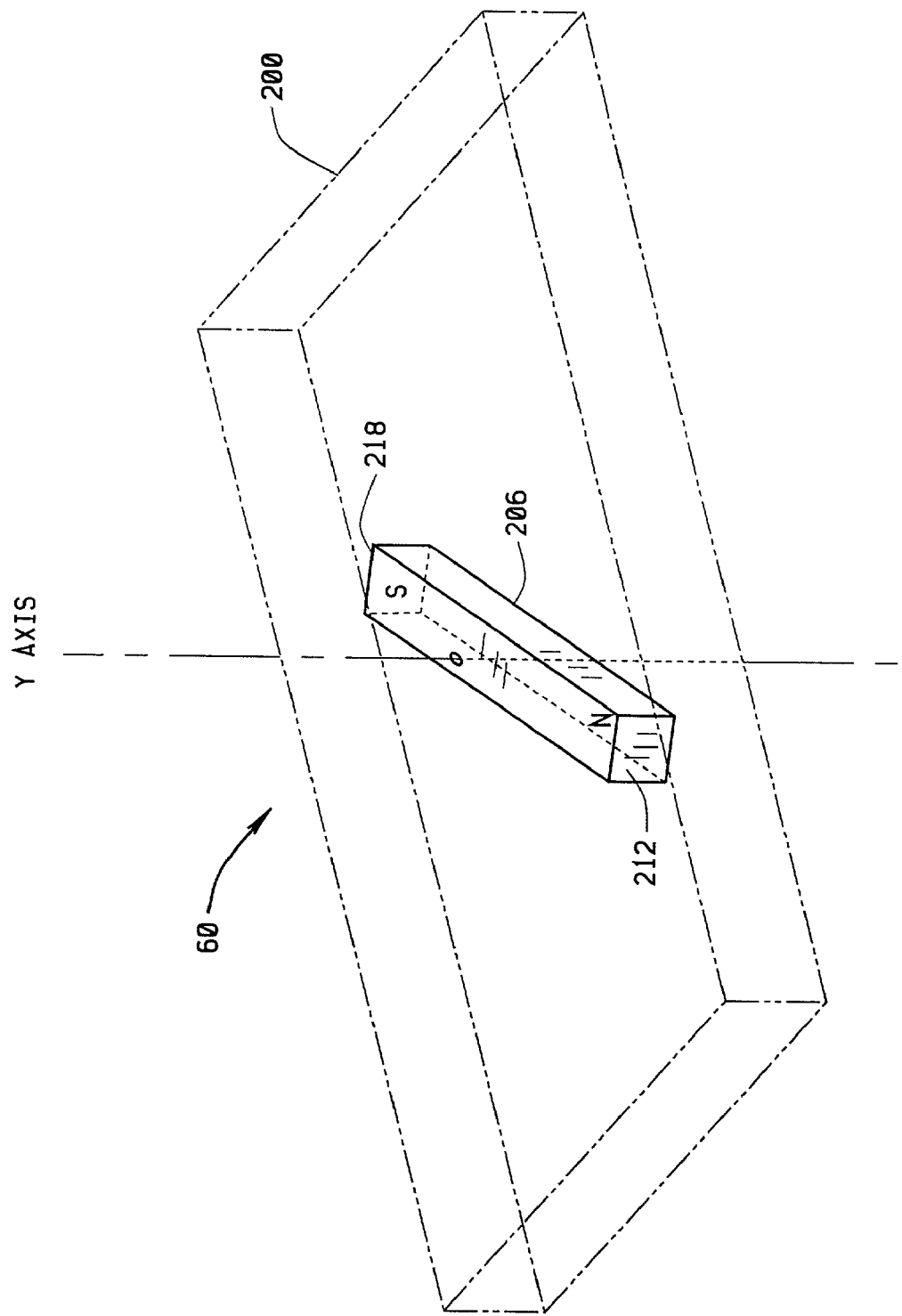
FIG. 3 is an isometric view of a non-intrusive unlatching device included in the gap covering system shown in FIG. 1.

FIG. 3 is an isometric view of non-intrusive unlatching device 60 included in gap covering system 10 (shown in FIG. 1). Unlatching device 60 is used to uncouple gap cover 14 (shown in FIG. 1) from outer shell 34 (shown in FIG. 1) by pivoting latch bar 46 from the latched position to the unlatched position without coming into physical contact with latch bar 46. Unlatching device 60 includes a block 200 constructed of non-magnetically permeable material such as ultra high molecular weight Polyethylene, aluminum or wood. Additionally, unlatching device 60 includes a magnetized bar 206 embedded within block 200. Magnetized bar 206 is oriented within block 200 such that a longitudinal axis of block 200 and a longitudinal axis of magnetized bar 206 have an angle between them, for example 45 degrees. Preferably block 200 is rectangular in shape but could be any shape suitable for magnetized bar 206 to be embedded therein. Magnetized bar 206 creates a magnetic field around block 200. When placed in close proximity to latch bar 46, the magnetic field exerts a force on latch bar 46 causing latch bar 46 to attempt to align itself within the magnetic field, much the same as a compass needle will attempt to align itself with the earth's north and south poles. The magnetic field created by bar 206 exerts a force on latch bar 46 strong enough to overcome the force exerted on latch bar 46 by biasing spring 52. However as described above, the force of biasing spring 52 combined with the retention force applied by flexible gap cover 14 maintain latch bar 46 in the latched position.

Therefore, in the preferred embodiment, to unlatch latching system 16 unlatching device 60 is placed on gap cover 14 in close proximity to latch bar 46 and a downward force is applied to unlatching device 60 causing the slightly arched width W of gap cover 14 to become essentially flat. The downward force releases the retention force applied to latching system 16 by gap cover 14, and disengages interlocked second beveled surface 88 and inclined surface 92. The angle of bar 206 within block 200 creates a magnetic field with flux lines misaligned with latch bar 46. Therefore, with the retention force removed and the beveled surfaces disengaged the misalignment of the magnetic field causes latch bar 46 to pivot and align within the magnetic field. Therefore pivot bar 46 pivots about pivot pin 64 (shown in FIG. 1) to the unlatched position.

In an alternate embodiment, the longitudinal axis of magnetic bar 206 and the longitudinal axis of block 200 are parallel. Therefore, to unlatch latching system 16 unlatching device 60 is placed on gap cover 14 in close proximity to latch bar 46 and a downward force is applied to unlatching device 60 causing the slightly arched width W of gap cover 14 to become essentially flat. The downward force releases the retention force applied to latching system 16 by gap cover 14, and disengages interlocked second beveled surface 88 and inclined surface 92. While downward force is applied, unlatching device 60 is simultaneously longitudinally rotated. This rotation also rotates the magnetic field created by magnetized bar 206. Latch bar 46 will attempt to remain aligned within the magnetic field and therefore pivot about pivot pin 64 to the unlatched position as device 60 and the magnetic field are rotated. Longitudinally rotated is defined to mean rotating unlatching device lengthwise about a Y axis perpendicular to outer shell 34. In the preferred embodiment, magnetized bar 206 is a bar magnet including a first end 212 having a north magnetic polarity and an opposing second end 218 having a south magnetic polarity. The opposing polarities on opposing ends 212 and 218 create the magnetic field in which latch bar 46 attempts to become aligned.

Figure 4:
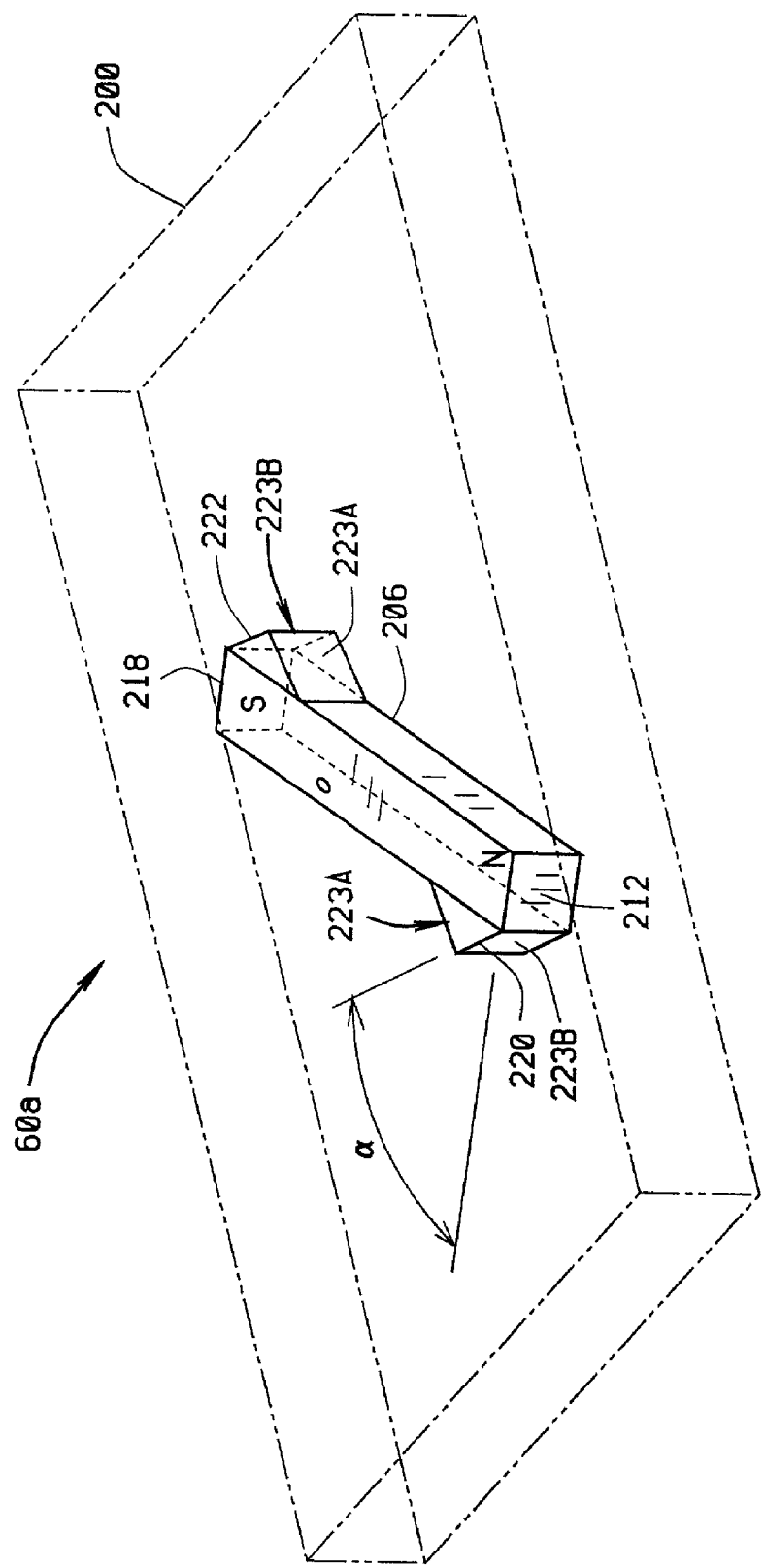
FIG. 4 is an isometric view of an alternate embodiment of the unlatching device shown in FIG. 3.

FIG. 4 is an isometric view of an alternate embodiment 60a of unlatching device 60 as shown in FIG. 3. In this embodiment, magnetized bar 206 is also a bar magnet including first end 212 having a north magnetic polarity and opposing second end 218 having a south magnetic polarity. Additionally, magnetized bar 206 includes a first soft iron wedge 220 bonded on first end 212 and a second soft iron wedge 222 bonded on second end 218. Wedges 220 and 222 focus, or direct, the magnetic field around the respective first and second ends 212 and 218, thereby increasing the force exerted on latch bar 46. Wedges 220 and 222 each have a center face 223A that essentially faces a longitudinal midpoint of bar 206 and distal face 223B that essentially faces away from the mid-point. It is envisioned that an angle α of faces 223B, with respect to first and second ends 212 and 218 range approximately between 50° and 70°, however the angle should not be so limited.

Figure 5:
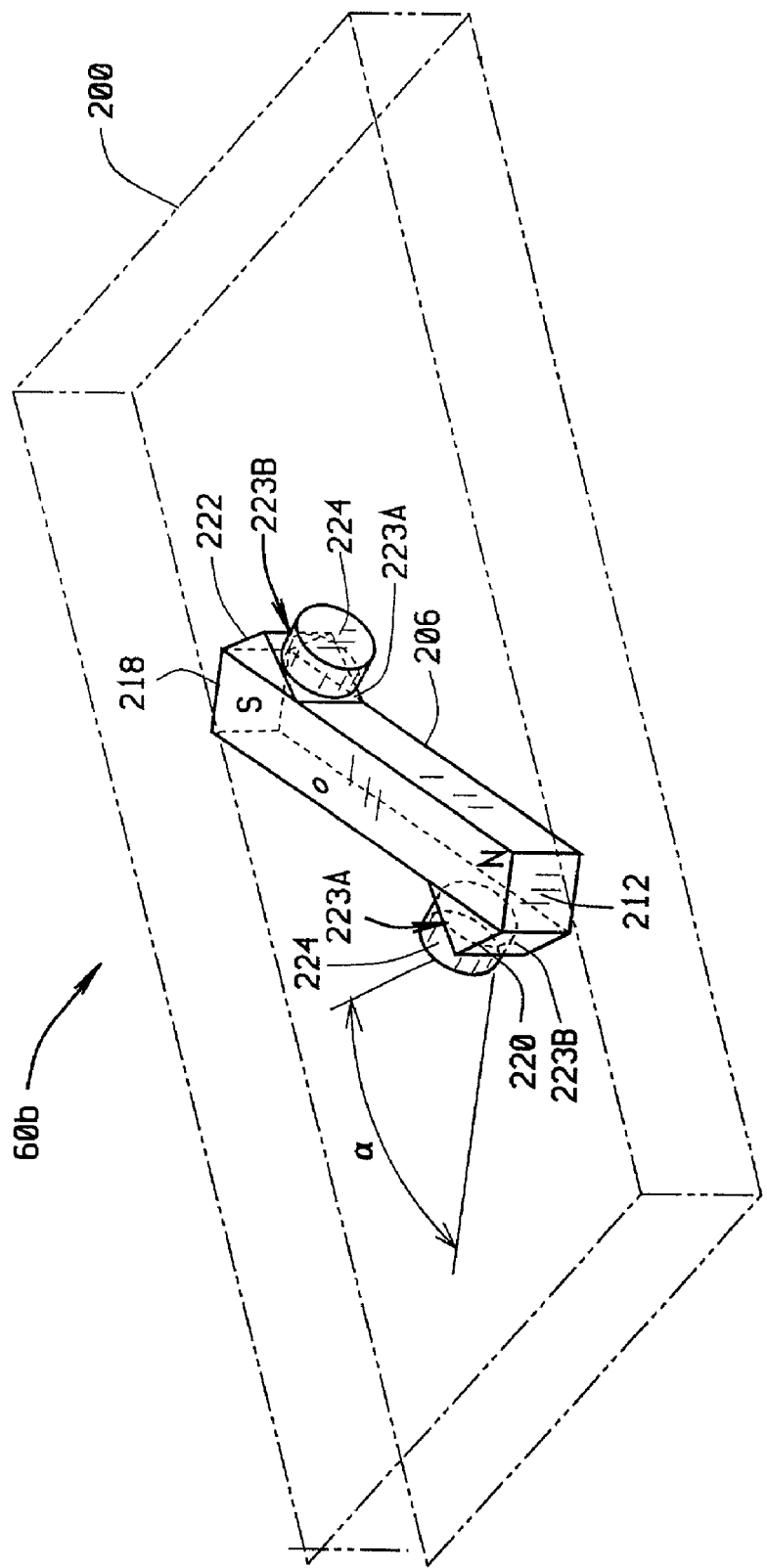
FIG. 5 is an isometric view of an alternate embodiment of the unlatching device shown in FIG. 4.

FIG. 5 is an isometric view of an alternate embodiment 60b of unlatching device 60 as shown in FIG. 4. In this embodiment, magnetized bar 206 is also a bar magnet including first end 212 having a north magnetic polarity, opposing second end 218 having a south magnetic polarity, and first and second soft iron wedges 220 and 222 having faces 223A and 223B. Additionally, magnetized bar 206 includes at least two cylindrical magnets 224. At least one cylindrical magnet 224 is mounted on at least one of faces 223A and 223B of first wedge 220, and at least one cylindrical magnet 224 is mounted on at least one of faces 223A and 223B of second wedge 222. Cylindrical magnets 224 provide additional magnetic force to unlatch pivoting latch bar 46.

Figure 6:
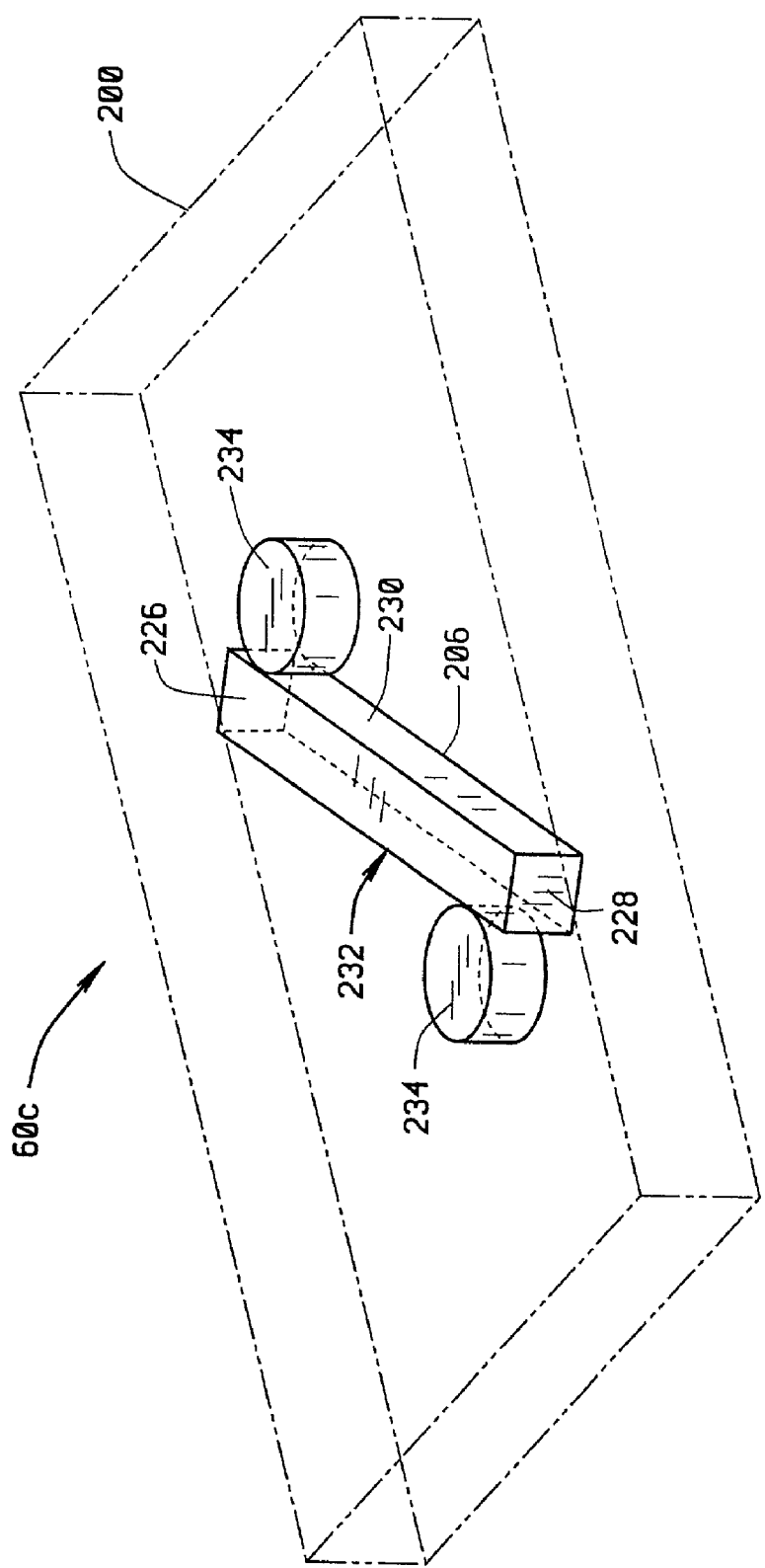
FIG. 6 is an isometric view of another alternate embodiment of the unlatching device shown in FIG. 3.

FIG. 6 is an isometric view of another alternate embodiment 60c of unlatching device 60 as shown in FIG. 3. In this embodiment, magnetized bar 206 is a magnetically permeable soft iron bar including a first end 226, an opposing second end 228, a first side 230 and an opposing second side 232. Additionally, magnetized bar 206 includes at least two cylindrical magnets 234. At least one cylindrical magnet 234 is coupled to first side 230 at first end 226, and at least one cylindrical magnet 234 is coupled to second side 232 at second end 228. Cylindrical magnets 234 create the magnetic field in which latch bar 46 attempts to become aligned. Cylindrical magnets 234 provide additional magnetic force to unlatch pivoting latch bar 46.

Figure 7:
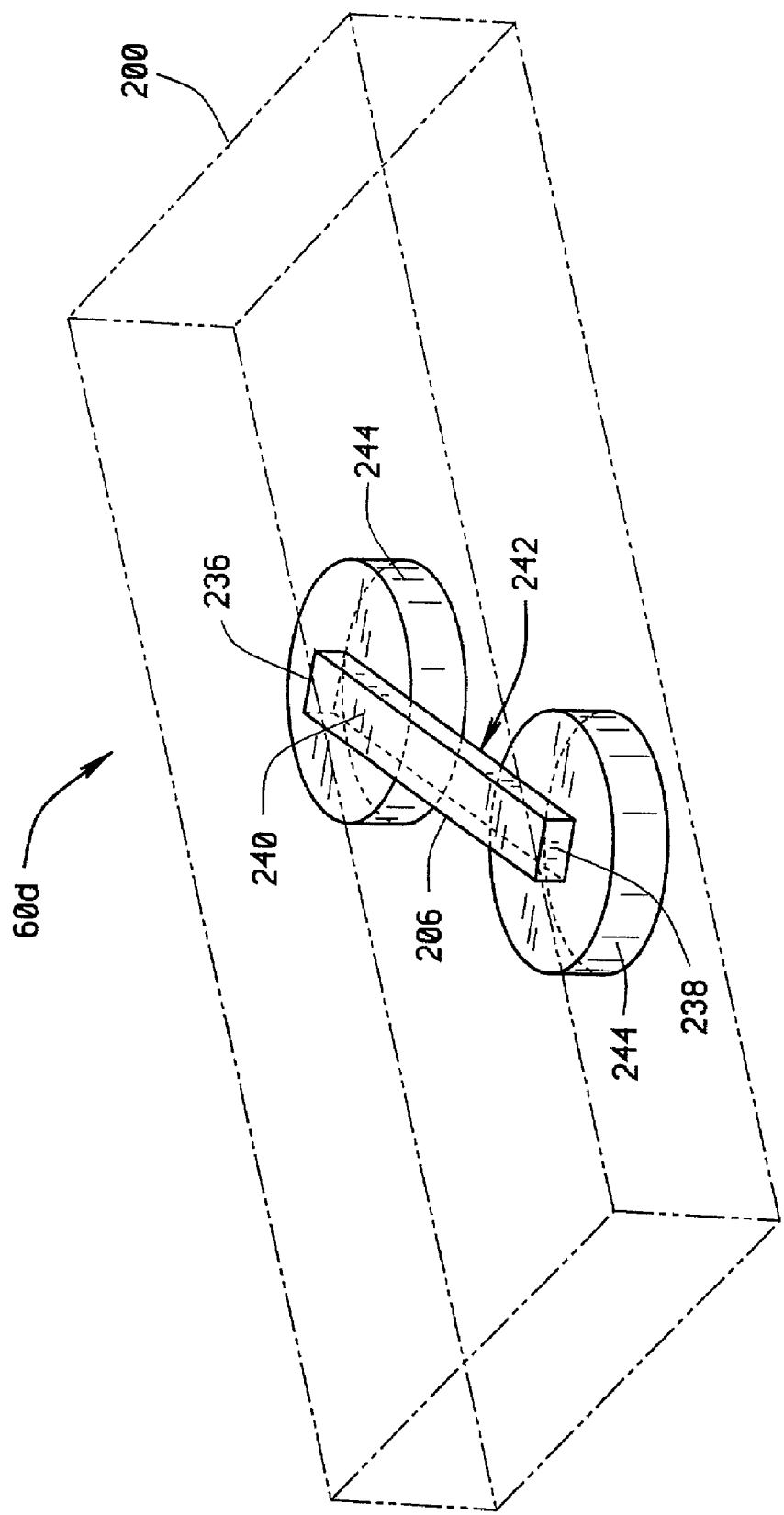
FIG. 7 is an isometric view of yet another alternate embodiment of the unlatching device shown in FIG. 3.

FIG. 7 is an isometric view of yet another alternate embodiment 60d of unlatching device 60 as shown in FIG. 3. In this embodiment, magnetized bar 206 is a soft iron bar including a first end 236, an opposing second end 238, a top side 240 and an opposing bottom side 242. Additionally, unlatching device 60 includes at least two disk magnets 244, for example Neodymium-Iron-Boron disk magnets. At least one disk magnet 244 is bonded to bottom side 242 at first end 236, and at least one disk magnet 244 is bonded to bottom side 242 at second end 238. Disk magnets 244 create the magnetic field in which latch bar 46 attempts to become aligned. Alternatively, disk magnets 244 are bonded to top side 240 at first end 236 and second end 238.

Although gap covering system 10 has been described herein in reference to an aircraft gap covering system, it should not be so limited. System 10 is suitable for more general applications. Generally, gap cover 14 could be any first structure. While outer shell 34 could be any second structure. Gap 22 could be any recess in the second structure such as a channel, a groove, a hole, a bore, a cavity, or a gap between adjacent panels that form the second structure. Fasteners 28 could be any appendage that protrudes from the second structure such as a screw, a rivet, a button or a handle. It should be understood that these terms could be used interchangeably herein throughout. In such a general application, system 10 would be used to cover the recess and/or appendage in or on the second structure by securing the first structure to the second structure using latching system 16.

While the invention has been described in terms of various specific embodiments, those skilled in the art will recognize that the invention can be practiced with modification within the spirit and scope of the claims.

What is claimed is:

1. A latching system for removably securing a first structure to a second structure, said system comprising:
   a magnetically permeable latch bar pivotally coupled to said first structure via a pivot pin, said latch bar pivotable about said pivot pin and comprising a pair of opposing latching ends, each latching end including a latching tab matable with a respective one of opposing end portions of an interlocking member fixedly coupled to the second structure;
   a biasing spring configured to pivot said latch bar to a latched position within a recess in said second structure, thereby interlocking the latching tabs with the interlocking member end portions and securing said first structure to said second structure; and
   a non-intrusive unlatching tool comprising an embedded magnetized bar, said unlatching tool adapted to pivot said latch bar to an unlatched position without said unlatching tool physically contacting said latch bar.

2. The system of claim 1, wherein said magnetized bar generates a magnetic field around said unlatching tool, said latch bar being pivoted to the unlatched position by placing said unlatching tool in close proximity to said latch bar such that the magnetic field exerts a rotating force on said latch bar that pivots said latch bar to the unlatched position.

3. The system of claim 2, wherein said magnetic bar comprises a bar magnet having a first end with a north magnetic polarity and an opposing second end with a south magnetic polarity, thereby generating the magnetic field around said unlatching tool.

4. The system of claim 2, wherein said magnetic bar comprises:
   a bar magnet having a first end with a north magnetic polarity;
   an opposing second end with a south magnetic polarity;
   a first embedded soft iron wedge coupled to said first end; and
   a second embedded soft iron wedge coupled to said second end, wherein said first and second soft iron wedges focus the magnetic field around said first and second ends of said bar magnet.

5. The system of claim 2 wherein said magnetic bar comprises:
   a bar magnet having a first end with a north magnetic polarity;
   an opposing second end with a south magnetic polarity;
   a first embedded soft iron wedge coupled to said first end;
   a second embedded soft iron wedge coupled to said second end;
   at least two cylindrical magnets wherein at least one said cylindrical magnet is coupled to said first soft iron wedge, and at least one said cylindrical magnet is coupled to said second soft iron wedge.

6. The system of claim 2, wherein said magnetic bar comprises a soft iron bar, and at least two cylindrical magnets, said soft iron bar including a first end having at least one of said cylindrical magnets coupled thereto, and an opposing second end having at least one of said cylindrical magnets coupled thereto, thereby generating the magnetic field around said unlatching tool.

7. The system of claim 2, wherein said magnetic bar comprises a soft iron bar and at least two disk magnets, said soft iron bar including a first end having at least one of said disk magnets coupled thereto, and an opposing second end having at least one of said disk magnets coupled thereto, thereby generating the magnetic field around said unlatching tool.

8. The system of claim 1, wherein each said end portion of said interlocking member comprises at least one strike tab comprising a beveled surface facing away from said second structure.

9. The system of claim 8, wherein at least one said latching tab includes a first beveled surface facing away from said first structure such that pressing said first beveled surface of said latch bar latching tab against said beveled surface of said strike tab causes said latch bar to pivot around said strike tab, and said biasing spring pivots said latch bar into the latched position when said latch bar end aligns with a slot in said strike tab.

10. The system of claim 9, wherein said strike tab slot comprises an inclined surface facing toward said second structure, and at least one of said latch bar latching tabs comprises a second beveled surface facing toward said first structure, said second beveled surface of said latch bar latching tab configured to interlock with said inclined surface of said strike tab slot when said latch bar is in the latched position.

11. The system of claim 1, wherein said system further comprises at least one stiffener coupled to said first structure, said stiffener configured to provide support to said first structure.

12. The system of claim 1, wherein:
said first structure comprises a gap cover;
said second structure comprises an outer shell of an aircraft;
said recess comprises a gap in said outer shell; and
said gap cover comprises an outer surface free from apertures and appendages.

13. A method for removably securing a first structure to a second structure, said method comprising:
pivotally coupling a magnetically permeable latch bar to the first structure via a pivot pin, the latch bar pivotable about the pivot pin and comprising a pair of opposing latching ends, each latching end including a latching tab matable with a respective one of opposing end portions of an interlocking member fixedly coupled to the second structure;
pressing the latch bar into a recess in the second structure whereby a biasing spring pivots the latch bar to a latched position, thereby interlocking the latching tabs with the interlocking member end portions such that the first structure is secured to the second structure; and
pressing a non-intrusive unlatching tool against the first structure such that the latch bar is pivoted to an unlatched position, the unlatching tool including a magnetized bar an embedded in a non-magnetically permeable block.

14. The method of claim 13, wherein the first structure includes an outer surface free from apertures and appendages, and wherein pivotally coupling comprises:
coupling at least one stiffener to the first structure, thereby providing support to the first structure; and
pivotally coupling the latch bar to the stiffener.

15. The method of claim 13, wherein at least one of the opposing latching tabs includes a first beveled surface facing away from the first structure, and wherein pressing the latch bar into the recess comprises:
coupling at least one strike tab to the second structure within the recess, the strike tab including a beveled surface facing away from the second structure; and
pressing the latch bar into the recess such that the first beveled surface of the latching tab contacts the beveled surface of the strike plate causing the latch bar to pivot around the strike tab whereby the biasing spring causes the latch bar to pivot to the latched position when the latching tab aligns with a slot in the strike tab.

16. The method of claim 15, wherein at least one of the latch bar latching ends includes a second beveled surface and the strike tab slot includes an inclined surface, and wherein pressing the latch bar into the recess comprises interlocking the latch bar second beveled surface with an inclined surface within the slot in the strike tab when said latch bar is in the latched position.

17. The method of claim 13, wherein pressing a non-intrusive unlatching tool comprises:
embedding the magnetic bar within the block such that there is a predetermined angle between a longitudinal axis of the magnetic bar and a longitudinal angle of the block;
generating a magnetic field around the unlatching tool utilizing the embedded magnetized bar; and
placing the unlatching tool against the first structure in close proximity to the latch bar such that the magnetic field exerts a rotational force on the latch bar which rotates the latch bar to the unlatched position.

18. The method of claim 17, wherein generating a magnetic field around the unlatching tool comprises constructing the unlatching tool such that the embedded magnetized bar includes at least one of:
a bar magnet having a first end with a north magnetic polarity and an opposing second end with a south magnetic polarity,
a bar magnet having a first end with a north magnetic polarity, an opposing second end with a south magnetic polarity, a first embedded soft iron wedge coupled to the first end, and a second embedded soft iron wedge coupled to the second end, wherein the first and second soft iron wedges focus the magnetic field around the first and second ends of the bar magnet, and
a bar magnet having a first end with a north magnetic polarity, an opposing second end with a south magnetic polarity, a first embedded soft iron wedge coupled to the first end, a second embedded soft iron wedge coupled to the second end, at least one first cylindrical magnet coupled to the first soft iron wedge, and at least one second cylindrical magnet coupled to the second soft iron wedge.

19. The method of claim 17, wherein generating a magnetic field around the unlatching tool comprises constructing the unlatching tool such that the embedded magnetized bar includes a soft iron bar and at least two cylindrical magnets, the soft iron bar including a first end having at least one of the cylindrical magnets coupled thereto, and an opposing second end having at least one of the cylindrical magnets coupled thereto.

20. The method of claim 17, wherein generating a magnetic field around the unlatching tool comprises constructing the unlatching tool such that the embedded magnetized bar includes a soft iron bar and at least two disk magnets, the soft iron bar including a first end having at least one of the disk magnets coupled thereto, and an opposing second end having at least one of the disk magnets coupled thereto.

21. A latching system comprising:
a first structure having an outer surface free from apertures and appendages;
a magnetically permeable latch bar pivotally coupled to said first structure, via a pivot pin, said latch bar pivotable about said pivot pin and comprising a pair of opposing latching ends, each latching end including a latching tab matable with a respective one of opposing end portions of an interlocking member fixedly coupled to the second structure; and
a biasing spring coupled to said first structure, said biasing spring configured to pivot said latch bar to a latched position within a recess in a second structure, thereby interlocking the latching tabs with the interlocking member end portions and securing said first structure to said second structure.

22. The system of claim 21, wherein said each end portion of said interlocking member comprises at least one strike tab comprising a beveled surface facing away from said second structure.

23. The system of claim 22, wherein at least one of said latching ends of said latch bar includes a first beveled surface facing away from said first structure, said first beveled surface adapted to contact said strike tab beveled surface when said latch bar is pressed into said recess, thereby pivoting said latch bar around said strike tab.

24. The system of claim 23, wherein at least one of said latching tabs further comprises a second beveled surface and said strike tab comprises a slot having an inclined surface within said slot, said latching tab second beveled surface configured to interlock with said slot inclined surface when said biasing spring pivots said latch bar into the latched position.

25. The system of claim 21, wherein said system further comprises at least one stiffener coupled to said first structure, said stiffener configured to provide support to said first structure.

26. The system of claim 21, wherein said system further comprises a non-intrusive magnetic field generating device configured to pivot said latch bar to an unlatched position by placing said magnetic field generating device against said first structure in close proximity to said latch bar such that a magnetic field generated by said magnetic field generating device exerts a rotating force on said latch bar, thereby pivoting said latch bar to the unlatched position.

27. The system of claim 21, wherein said first structure comprises an aircraft gap cover, said second structure comprises an outer shell of an aircraft, said recess comprises a gap in said outer shell.

28. A non-intrusive unlatching device for unlatching a concealed latching device that includes a magnetically permeable pivotal latch bar, said unlatching tool comprising a non-magnetically permeable block and a magnetized bar embedded in said block such that there is a predetermined angle between a longitudinal axis of said block and a longitudinal axis of said magnetic bar, said unlatching device configured to pivot the latch bar to an unlatched position without said unlatching device physically contacting said latch bar, wherein said embedded magnetic bar comprises a bar magnet having a first end with a north magnetic polarity, an opposing second end with a south magnetic polarity, a first embedded soft iron wedge coupled to said first end, and a second embedded soft iron wedge coupled to said second end, wherein said first and second soft iron wedges focus the magnetic field around said first and second ends of said bar magnet.

29. A non-intrusive unlatching device for unlatching a concealed latching device that includes a magnetically permeable pivotal latch bar, said unlatching tool comprising a non-magnetically permeable block and a magnetized bar embedded in said block such that there is a predetermined angle between a longitudinal axis of said block and a longitudinal axis of said magnetic bar, said unlatching device configured to pivot the latch bar to an unlatched position without said unlatching device physically contacting said latch bar, wherein said embedded magnetic bar comprises a bar magnet having a first end with a north magnetic polarity, an opposing second end with a south magnetic polarity, a first embedded soft iron wedge coupled to said first end, a second embedded soft iron wedge coupled to said second end, at least one first cylindrical magnet coupled to said first soft iron wedge, and at least one second cylindrical magnet coupled to said second soft iron wedge, thereby generating the magnetic field.

30. A non-intrusive unlatching device for unlatching a concealed latching device that includes a magnetically permeable pivotal latch bar, said unlatching tool comprising a non-magnetically permeable block and a magnetized bar embedded in said block such that there is a predetermined angle between a longitudinal axis of said block and a longitudinal axis of said magnetic bar, said unlatching device configured to pivot the latch bar to an unlatched position without said unlatching device physically contacting said latch bar, wherein said embedded magnetic bar comprises a soft iron bar and at least two cylindrical magnets, said soft iron bar including a first end having at least one of said cylindrical magnets coupled thereto, and an opposing second end having at least one of said cylindrical magnets coupled thereto, thereby creating the magnetic field around said unlatching device.

31. A non-intrusive unlatching device for unlatching a concealed latching device that includes a magnetically permeable pivotal latch bar, said unlatching tool comprising a non-magnetically permeable block and a magnetized bar embedded in said block such that there is a predetermined angle between a longitudinal axis of said block and a longitudinal axis of said magnetic bar, said unlatching device configured to pivot the latch bar to an unlatched position without said unlatching device physically contacting said latch bar, wherein said embedded magnetic bar comprises a soft iron bar and at least two disk magnets, said soft iron bar including a first end having at least one of said disk magnets coupled thereto, and an opposing second end having at least one of said disk magnets coupled thereto, thereby creating the magnetic field around said unlatching device.

* * * * *